J. T. WHEELER.
Gas-Meter Prover.
No. 205,456. Patented June 25, 1878.
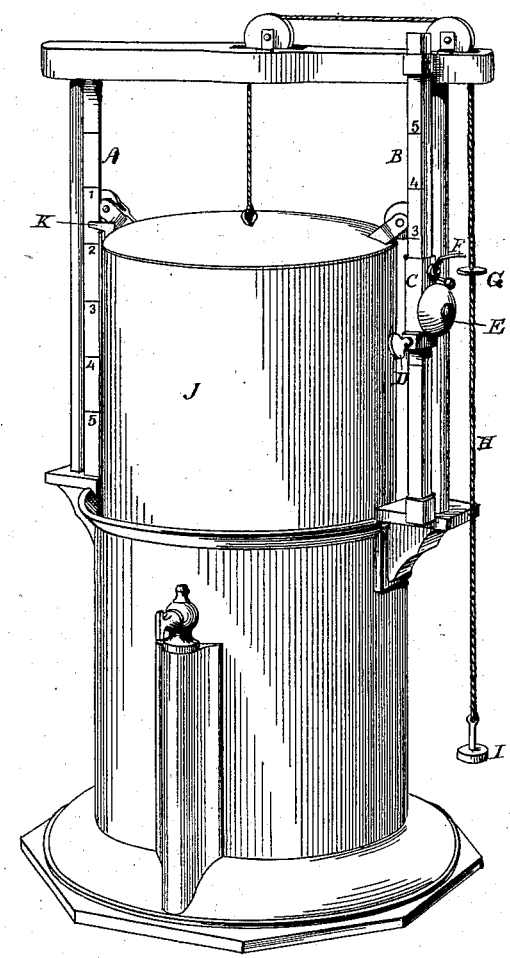

UNITED STATES PATENT OFFICE.

JOHN T. WHEELER, OF DETROIT, MICHIGAN.

IMPROVEMENT IN GAS-METER PROVERS.

Specification forming part of Letters Patent No. 205,456, dated June 25, 1878; application filed April 13, 1878.

*To all whom it may concern:*

Be it known that I, JOHN T. WHEELER, of Detroit, in the county of Wayne and State of Michigan, have invented an Improvement in Gas-Meter Provers, of which the following is a specification:

The nature of this invention relates to new and useful attachments to gas-meter provers; and the invention consists in attaching to said machines a graduated bar and an alarm, by means of which, when the desired point is reached, the alarm is sounded, calling the attention of the operator, who may be otherwise engaged at the time, to the fact, as is more fully hereinafter set forth.

In the drawings a meter-tester of the usual construction is shown, and provided with the scale A, graduated into cubic feet and tenths. There is also attached to the tester, at any convenient point, a rod, B, also graduated to cubic feet. This rod is graduated inversely to the graduated scale A.

A slide, C, provided with a set-screw, D, or other suitable locking device, is arranged to have a vertical adjustment on the bar B. Secured to this slide is a bell, E, and a bell-crank, F, carrying a striking-hammer, which is operated by a trip-stop, G, secured to the chain H, to which the counter-balance I is attached.

We will suppose the gas-holder J to be filled with gas, so that the index-finger K is at zero, as upon the scale A. The meter to be tested we will suppose to be a five-foot meter. The slide is moved to the five-foot mark on the rod B, and the meter attached to the prover in the ordinary way.

As the gas passes from the prover to the meter the holder falls, thereby raising the trip-stop on the chain, continuing such motion until, if the meter is correct, the index K points to the finger five on the scale A, and at the same instant the trip-stop will cause the bell to ring, thus calling the attention of the operator, who, by a glance, discovers the correctness or incorrectness of the meter.

I do not desire to confine myself to the construction which I have described, as the alarm may be attached to the prover in different ways, one of which I have described, and shown in the accompanying drawings.

What I claim as my invention is—

1. The combination, with a meter-tester, of the graduated rod B, having the adjustable sleeve C, provided with an alarm, substantially as described and shown.

2. In a meter-prover, the combination, with the rod B, of the sleeve C, adjustably secured to such rod by screw D, and having the bell E and bell-crank F, and the trip-stop G, all constructed, arranged, and operated substantially as described and shown.

JOHN T. WHEELER.

Witnesses:
H. S. SPRAGUE,
PETER E. DEMILL, Jr.